(12) United States Patent
Wright et al.

(10) Patent No.: US 8,480,782 B2
(45) Date of Patent: Jul. 9, 2013

(54) COATED FERTILIZER PARTICLES

(75) Inventors: Danny R. Wright, Buford, GA (US);
Richard J. Valagene, Republic, MO (US); Don T. Cherry, Stamford, CT (US); Keith D. Cochran, Killen, AL (US); Tim G. Holt, Florence, AL (US); Gregory S. Peeden, Killen, AL (US)

(73) Assignee: Tiger-Sul Products LLC, Atmore, AL (US)

(*) Notice: Subject to any disclaimer, the term of this patent is extended or adjusted under 35 U.S.C. 154(b) by 0 days.

(21) Appl. No.: 13/275,924

(22) Filed: Oct. 18, 2011

(65) Prior Publication Data

US 2012/0090367 A1  Apr. 19, 2012

Related U.S. Application Data

(60) Provisional application No. 61/394,082, filed on Oct. 18, 2010.

(51) Int. Cl.
| | | |
|---|---|---|
| *C05C 9/00* | (2006.01) | |
| *C05C 5/02* | (2006.01) | |
| *C05C 5/04* | (2006.01) | |
| *C05B 7/00* | (2006.01) | |
| *C05D 9/00* | (2006.01) | |
| *C05D 9/02* | (2006.01) | |

(52) U.S. Cl.
USPC ........... 71/64.07; 71/28; 71/29; 71/30; 71/31; 71/48; 71/49; 71/50; 71/53; 71/54; 71/58; 71/59; 71/60; 71/61; 71/63

(58) Field of Classification Search
USPC ............................. 71/11–63, 64.07
See application file for complete search history.

(56) References Cited

U.S. PATENT DOCUMENTS

| | | | | |
|---|---|---|---|---|
| 3,096,171 | A * | 7/1963 | Woerther | 71/64.07 |
| 3,305,491 | A * | 2/1967 | Oster | 252/384 |
| 3,321,298 | A * | 5/1967 | Bidlack, Sr. et al. | 71/64.07 |
| 3,458,303 | A * | 7/1969 | Belak et al. | 71/64.07 |
| 3,541,204 | A | 11/1970 | Sibbald et al. | |
| 3,565,599 | A * | 2/1971 | Sor et al. | 71/28 |
| 3,959,493 | A | 5/1976 | Baalsrud et al. | |
| 4,713,245 | A | 12/1987 | Ando et al. | |
| 4,880,455 | A * | 11/1989 | Blank | 71/28 |
| 4,936,897 | A * | 6/1990 | Pipko et al. | 71/64.05 |
| 5,123,950 | A * | 6/1992 | Homma et al. | 71/11 |
| 5,227,166 | A | 7/1993 | Ueda et al. | |
| 5,443,845 | A * | 8/1995 | Felix | 424/490 |
| 5,725,885 | A * | 3/1998 | Felix et al. | 424/490 |
| 5,807,594 | A | 9/1998 | King et al. | |
| 6,231,633 | B1 * | 5/2001 | Hirano et al. | 71/64.07 |
| 6,242,013 | B1 | 6/2001 | Luhman et al. | |
| 6,309,439 | B1 * | 10/2001 | von Locquenghien et al. | 71/11 |
| 6,315,807 | B1 * | 11/2001 | Patra et al. | 71/28 |
| 6,500,223 | B1 * | 12/2002 | Sakai et al. | 71/64.07 |
| 6,663,686 | B1 * | 12/2003 | Geiger et al. | 71/28 |
| 6,749,659 | B1 | 6/2004 | Yu et al. | |
| 6,787,234 | B2 * | 9/2004 | Tijsma et al. | 428/403 |
| 7,267,707 | B2 * | 9/2007 | Rosenthal et al. | 71/64.11 |
| 7,416,785 | B2 * | 8/2008 | Mente | 428/407 |
| 8,163,059 | B2 * | 4/2012 | Tran et al. | 71/64.07 |
| 2004/0016276 | A1 * | 1/2004 | Wynnyk et al. | 71/64.11 |
| 2004/0020254 | A1 * | 2/2004 | Wynnyk et al. | 71/64.11 |

FOREIGN PATENT DOCUMENTS

JP          3-60486      *   3/1991

* cited by examiner

*Primary Examiner* — Wayne Langel
(74) *Attorney, Agent, or Firm* — Oliff & Berridge, PLC

(57) ABSTRACT

A composition has a core of at least one fertilizer substance and at least one layer of a coating material surrounding the core. The core may contain nitrogen and the coating material may include one or more linear, saturated aliphatic monocarboxylic acids.

17 Claims, No Drawings

COATED FERTILIZER PARTICLES

This nonprovisional application claims the benefit of U.S. Provisional Application No. 61/394,082, filed Oct. 18, 2010.

BACKGROUND

This disclosure is generally directed to coated fertilizer particles including a fertilizer substance core coated with coating material that may comprise linear or branched aliphatic monocarboxylic acids. The coated fertilizer particles may also comprise sealants, such as waxes. Also disclosed is a method of making coated fertilizer particles.

In the agricultural industry, it is known to apply fertilizers in a granular or pastille form. Granulation has benefits both in storage and in dissemination of the fertilizer. Granulation can be achieved by various methods. For example, granular fertilizers can be produced through a chemical reaction where heat is generated to produce granulation of a liquid fertilizer (such as sulfuric acid, phosphoric acid, or ammonia) into a solid form. However, it is difficult to control the release characteristics of the fertilizer with granulation techniques.

Controlling the release rate of fertilizer to the soil has been recognized to be agronomically important. Such control can minimize loss of water-soluble fertilizers as a result of irrigation or heavy rainfall. Controlling the release rate of the fertilizer may also provide the following benefits: reducing the amount of applied fertilizer material that escapes into the aquasphere, which pollutes waterways; improving the uptake of fertilizer plant nutrient material by timing the release to match plants' needs; keeping the fertilizer nutrients in the root growing zone of the soil; and minimizing sequestration by adsorption at deeper levels where it is unavailable to the plant. In the case of plant micronutrients, controlled release of high analysis fertilizer material prevents the development of toxic concentrations of these materials, which are by definition required in very small quantities. Improving the spatial distribution of the micronutrient materials is also a benefit.

Sulfur has previously been used as a control release agent for fertilizers. Sulfur coated urea in various commercial forms is an example. However, there are problems associated with using only elemental sulfur for such purposes, such as difficulty controlling and varying the rate of release, or providing incomplete coverage or developing fractures with aging, which allows ingress of water and rapid depletion of the carried fertilizer material. Also, a process that depends solely on the degradation of sulfur by microbiological action to expose the carried fertilizer is hard to control and is markedly dependent on soil temperature. Formulations that perform well in tropical or subtropical climates may perform poorly in temperate or cool soils. Adjusting formulations and process conditions to meet these requirements using only elemental sulfur has not been well demonstrated.

Blending a swelling clay material with liquid elemental sulfur and solidifying to create a controlled release plant nutrient sulfate fertilizer is also known. The presence of the swelling clay in the solid sulfur particle accelerates the breakdown of the solid sulfur into a small particulate size distribution that promotes subsequent microbiological conversion of the sulfur to plant nutrient sulfate. Cheap and available elemental sulfur can thus be used to control the rate of release of sulfur into the soil.

Further attempts have been made to supplement sulfur as a control release agent by combining bentonite clays with sulfur to form a sulfur/clay matrix. An example of this composition is described in "Another Approach to S Forming," Sulfur, September-October 1995 and in "Ground, Degradable Sulfur Granules Suitable for Bulk Blending," Sulfur 99, 17-20 Oct. 1999. These articles describe sulfur granules produced in a granulation drum. The control of the granulation step is based on the recycle loop, which is fed continuously with ammonium sulfate seed crystals.

U.S. Pat. No. 6,749,659 discloses that a controlled release property can be imparted to a fertilizer formulation by combining the fertilizer material or materials with a coating, carrier matrix, or similar component comprising elemental sulfur in admixture with swelling clays.

Although the above attempts to control the release of a fertilizer substance into the soil have shown some success, the need still exists to provide a fertilizer composition that allows better controlled release of a fertilizer substance into the soil, and resists being washed away from plants by heavy rainfall or irrigation.

Although in a different field of endeavor, a few patents disclose coatings for controlling the release of nutrients in animal feeds, particularly animal feeds for ruminants, that include hydrogenated oils, fatty acids, or waxes.

For example, U.S. Pat. No. 3,541,204 discloses hydrogenated vegetable and animal fats and waxes such as rice bran wax as coatings that survive the rumen but are disrupted in the intestinal tract.

U.S. Pat. No. 3,959,493 describes utilizing aliphatic fatty acids having at least 14 carbon atoms each. The fatty acids are applied as a coating to an individual nutrient. The fatty acids are said to be resistant to rumen degradation. The active agents are then delivered to the abomasum and/or intestine where the fatty acids are reduced in the post-ruminal environment.

U.S. Pat. No. 4,713,245 discloses a rumen-surviving granule comprising a core of bioactive material, a coating substance stable at neutral pH (as found in the rumen) but dissolved or disintegrated at pH=3 (as found in the abomasum), and at least one other coating selected from the group consisting of fatty acids having at least 14 carbon atoms and waxes, animal fat, and vegetable fat having a melting point of 40° C. or higher.

U.S. Pat. No. 5,227,166 discloses a feed supplement for ruminants consisting of a coated biologically active substance, such as an amino acid, drug, or vitamin, The coating composition comprises lecithin, at least one inorganic substance which is stable in neutrality and soluble under acidic conditions, and at least one substance selected from the group consisting of straight-chain or branched-chain saturated or unsaturated monocarboxylic acids having 14 to 22 carbon atoms, salts thereof, hardened vegetable oils, hardened animal oils, and waxes.

U.S. Pat. No. 5,807,594 describes a method of improving weight gain and feed efficiency in a ruminant by encapsulating a choline chloride composition in a rumen-protected carrier. Disclosed encapsulating or coating materials include hydrogenated oils, mono- and di-glycerides, waxes, and seed fats.

U.S. Pat. No. 6,242,013 describes a ruminally-protected high oleic material produced by roasting oilseeds at high temperatures to protect the fatty acids fed to ruminants. However, the roasting procedures require costly energy consumption.

SUMMARY

This disclosure provides an improved composition containing a fertilizer substance that is coated with a coating material that may comprise linear or branched aliphatic monocarboxylic acids. The coating composition may also include, for example, sealants, such as waxes.

In embodiments, the composition may comprise a core material comprising at least one fertilizer substance and a coating material surrounding the core material.

In embodiments, a fertilizer composition may comprise a granulated core material comprising at least urea or sulfur-swelling clay-encapsulated ammonium sulfate and a coating material that may comprise linear or branched aliphatic monocarboxylic acids.

Also disclosed is a method of making a fertilizer composition that may comprise coating a core comprising a fertilizer substance with a continuous layer of a coating material that may comprise linear or branched aliphatic monocarboxylic acids, and allowing the layer of coating material to solidify.

DETAILED DESCRIPTION OF EMBODIMENTS

Embodiments relate to fertilizer compositions comprising a core that is coated with a coating material, which is stable in soil and is resistive to water, such as water from heavy rainfall or irrigation.

The core comprises at least a fertilizer substance. The core may be a single granule, or may include a matrix comprising one or more excipients, such as binding substances, and inert ingredients that together aid the formation of pastilles or granulated fertilizer substances. The core may comprise one or more fertilizer substances, generally in a solid form, and should be firm enough so as to remain intact during the following phases of processing, especially during the operations of coating.

The term "fertilizer substance" is used broadly throughout this specification to include all types of fertilizers, macronutrients, and micronutrients. In embodiments, fertilizers may include ammonium sulfate, urea, potash, ammonium, phosphate, potassium nitrate, calcium nitrate, sodium nitrate, sulfate of potash (also called potassium sulfate), monoammonium phosphate (MAP), diammonium phosphate (DAP), triple super phosphate, and NPK fertilizers (compound fertilizer with nitrogen, phosphate, and potassium included in one granule). In embodiments, micronutrients may include iron, copper, zinc, boron, manganese, and their oxy-sulfate, sulfate, and oxide forms. In embodiments, macronutrients may include nitrogen, phosphorus, potassium, calcium, and sulfur. These "fertilizer substances" may be used individually, or mixed together in varying weight ratios.

In embodiments, the fertilizer substances may be incorporated into a sulfur-swelling clay matrix. For example, a granule containing an ammonium sulfate crystalline core or seed may be encapsulated in a shell or matrix of sulfur-swelling clay, such as bentonite clay, that may optionally contain ammonium sulfate fine. Fertilizers including a swelling clay matrix are described in U.S. Pat. No. 6,749,659, which is incorporated herein by reference in its entirety. These sulfur-swelling clay-encapsulated fertilizer substances may then be coated with a coating material that may comprise linear or branched aliphatic monocarboxylic acids.

In addition, the physical characteristics of the core may range from very fine, almost powdery, to large granules. Therefore, the chemical and physical properties of the final product, and thus its ability to be effectively utilized to fertilize plants, are directly related to the chemical and physical characteristics of the fertilizer substance that is chosen.

The particle size of the core may be in the range of about 0.5 mm to about 5.0 mm, such as in the range of about 1.0 mm to about 3.0 mm, or in the range of about 1.0 mm to about 2.0 mm, or in the range of about 2.0 mm to about 3.0 mm, or in the range of about 2.0 mm to about 4.0 mm, or in the range of about 2.0 mm to about 2.5 mm, or in the range of about 2.5 mm to about 3.0 mm. In embodiments, the fertilizer substance may include granulated urea and/or an ammonium sulfate in a sulfur-swelling clay matrix, as described in U.S. Pat. No. 6,749,659.

The coating materials for coating a core containing the fertilizer substance may comprise linear or branched aliphatic monocarboxylic acids having from 2 to 34 carbon atoms, such as, for example, from 2 to 24 carbon atoms, or from 10 to 34 carbon atoms, or from 14 to 22 carbon atoms, or from 16 to 22 carbon atoms, or from 16 to 20 carbon atoms, or from 18 to 24 carbon atoms. The aliphatic monocarboxylic acids may be saturated or unsaturated. Unsaturated aliphatic monocarboxylic acids may have 1, 2, 3, 4, or more double bonds, where each double bond is independently in the cis or trans conformation. As used herein, "aliphatic monocarboxylic acid" includes aliphatic monocarboxylic acids that are in free form, salts of aliphatic monocarboxylic acids, and esterified aliphatic monocarboxylic acids, such as a mono-, di-, or triglycerides, and phospholipids.

Aliphatic monocarboxylic acids may be obtained from naturally occurring sources, or may be synthesized. Examples of sources of aliphatic monocarboxylic acids include vegetable oil, animal fat, and waxes. Examples of suitable vegetable oils include palm oil, soybean oil, rapeseed (canola) oil, cottonseed oil, and castor oil. The vegetable oil may be partially or fully hydrogenated. An exemplary hydrogenated soybean oil is commercially available as Bunge Oil Soybean Flakes manufactured by Bunge, Ltd. In some embodiments, hydrogenated rapeseed (canola) oil may be used. Such a hydrogenated rapeseed (canola) oil is commercially available as AGRIPURE AP-660 manufactured by Cargil (Hamburg, Germany). Examples of suitable animal fats include beef tallow and lard. The animal fat may be partially or fully hydrogenated. Examples of waxes include carnauba wax, beeswax, paraffin wax, and other natural and synthetic waxes.

As an alternative to using, for example, hydrogenated vegetable oils or hardened animal fats as raw materials for the coating material, one or more free fatty acids may be used as the raw materials. For example, palmitic acid, commercially available as Palmitic Acid 95% FGK from ACME Hardestry (Malaysia) may be mixed with stearic acid, commercially available as Stearic Acid 90% FGK from ACME Hardestry (Malaysia) to obtain a coating material having a high percentage of linear, saturated aliphatic monocarboxylic acids. Other free saturated fatty acids are also commercially available, as well as free unsaturated fatty acids, such as, for example, oleic acid commercially available as Oleic Acid 80% FGK from ACME Hardestry (Malaysia). Of course, there are numerous commercially available sources of aliphatic monocarboxylic acids, including many different grades and purities, that are suitable for the coating material.

The coating material may comprise one or more aliphatic monocarboxylic acids originating from one or more sources, such as the sources described above. Vegetable oils, among other things, contain a mixture of various fatty acids. For example, soybean oil contains about 51% linoleic acid (C18:2), 23% oleic acid (C18:1), 10% palmitic acid (C16), 7% α-linolenic acid, and 4% stearic acid (C18). Hydrogenating oils and fats increases the degree of saturation of the fatty acids, which in turn increases an oil's viscosity and melting point. Another way of increasing the melting point of a coating material comprising aliphatic monocarboxylic acids is to increase the amount of saturated aliphatic monocarboxylic acids present in the coating material. For example, soybean oil may be supplemented with palmitic acid (C16), stearic acid (C18), and/or oleic acid (C18:1) to increase the amount of saturated aliphatic monocarboxylic acids present in the coating material. Other supplemental compounds that may be added to the coating material include lecithin, palm oil, castor oil, and combinations thereof.

The coating material may comprise from about 60 to 100 wt % linear, saturated aliphatic monocarboxylic acids per total weight of the coating material, or from about 70, 75, 80, 85, or 90 wt % to about 100, 99, 98, 97, 96, 95, 94, 93, 92, or 91 wt % linear, saturated aliphatic monocarboxylic acids per total weight of the coating material.

The linear, saturated aliphatic monocarboxylic acids present in the coating material may consist of or consist essentially of a single linear, saturated aliphatic monocarboxylic acid, such as, for example, stearic acid (C18), oleic acid (C18:1), erucic acid (C22:1), acetic acid (C2), linoleic acid (C18:2), linolenic acid (C18:3), and palmitic acid (C16). Or, the linear, saturated aliphatic monocarboxylic acids present in the coating material may comprise a mixture of two or more linear, saturated aliphatic monocarboxylic acids. For example, the coating material may comprise a mixture of stearic acid, palmitic acid, and/or oleic acid. The mixture of stearic acid, palmitic acid, and/or oleic acid may account for 90 wt % or more of the total weight of linear, saturated aliphatic monocarboxylic acids present in coating material, such as about 91, 92, 93, 94, 95, 96, 97, 98, 99, or 100 wt % of the total weight of linear, saturated aliphatic monocarboxylic acids present in coating material, although amounts below 90 wt % may also be used.

To obtain the above amounts of linear, saturated aliphatic monocarboxylic acids in the coating material, a partially to fully hydrogenated vegetable oil may be used. For example, the vegetable oil may be hydrogenated in the range from about 60% to 100%, such as in the range of about 60% to about 70%, or in the range of about 65% to about 75%, or in the range of about 70% to about 80%, or in the range of about 75% to about 85%, or in the range of about 80% to about 90%, or in the range of about 85% to about 95%, or in the range of about 90% to 100%, or in the range of about 95% to 100%.

Examples of supplementary compounds that may increase the amount of saturated aliphatic monocarboxylic acids present in the coating material include oleic acid, erucic acid, stearic acid, acetic acid, linoleic acid, linolenic acid, palmitic acid, and lecithin. The above supplementary compounds may be used individually or mixed together in varying weight ratios. The supplementary compounds may be used in conjunction with partially to fully hydrogenated vegetable oils.

In embodiments the supplementary compound used in the coating material may be oleic acid. Such an oleic acid is commercially available as Oleic Acid Veg. Manufactured by Acme-Hardesty Co.

The supplementary compound may be added to the coating material surrounding the core material in any suitable amount. In embodiments, the amount of the supplementary compound in the coating material may be in the range of about 0.50% to about 2.00% by weight of the core material and the coating material, such as in the range from about 0.75% to about 1.75%, or in the range from about 0.90% to about 1.50%, or in the range from about 1.00% to about 1.25%, or in the range from about 1.25% to about 1.50%, or in the range from 0.95% to about 1.55% by weight.

The coating materials may have a melting temperature in the range of from about 40° C. to about 80° C., such as in the range of about 50° C. to about 60° C., or in the range of about 60° C. to about 70° C., or in the range of about 70° C. to about 80° C., or in the range of about 55° C. to about 65° C., or in the range of about 60° C. to about 75° C., to ensure that the coating on the final product has a hard surface, thereby preventing agglomeration of the final product, and also to increase the stability of the product in the soil.

The core material and the coating material surrounding the core material may also optionally be coated by one or more waxes. Any suitable wax may be used. Examples of suitable waxes include Eva Coat, R3053A, and R4408A all commercially available from IGI Inc.

The waxes may be added in any suitable amount. In embodiments, the amount of wax used may be in the range from about 0.5% to about 5.0% by weight of the core material and the coating material surrounding the core material, such as 1%, or 1.5%, or 2%, or 2.5%, or 3% by weight.

The core containing the fertilizer substance may be coated with a sufficient amount of coating material to completely coat the core and to retain a percentage of the fertilizer substance in the core of at least 85%, such as at least 87%, or at least 90%, or at least 95%, or at least 98% or at least 99%, as measured by the Method N-500 slow release test.

In embodiments, the weight percent ratio of the core to the coating material may be in the range from about 75:25 to about 95:5, such as 77:23, or 80:20, or 82:18, or 85:15, or 87:13, or 90:10 or 92:8.

In addition to exhibiting retention of fertilizer material of at least 85%, the coated core material may also have a prescribed percentage of fertilizer substance. In embodiments, the percentage of fertilizer substance may be at least 35% by weight in relation to the weight of the core and the coating material surrounding the core, such as in the range of 35% to about 45%, or in the range of 37% to about 43%, or in the range of about 41.0% to about 43.5%.

The core may be coated by spray coating (for example, top, bottom, or side spray coating), drum coating, pan coating, fluid bed coating, continuous pour coating, or any other method known to those of skill in the art. This coating may be done in a batch or in a continuous process. The core may be coated with a single layer of the coating material applied in a single coating application, or the core may be coated with multiple layers of coating material, such as, for example, 2, 3, 4, 5, 6, 7, 8, 9, or more layers. Each layer surrounding the core may independently comprise the same coating material or one or more different coating materials.

When coating the core, the coating material may be heated to above its melting point temperature so that the coating material is in a liquid state when it is applied to the core. After application of the liquid coating material to the core, the coated core is allowed to cool so that the coating material solidifies forming a solid layer surrounding the core. This process may be repeated one or more times to produce multiple layers of coating materials surrounding the core.

If consecutive layers of the same coating material are applied to the core as described above, the individual layers may not be distinguishable in the final product. However, the multilayering process described above imparts distinctive structural characteristics to the final product when compared to a product surrounded by a single layer of the same coating material having the same thickness as the coat of the multi-layered product. While the liquid coating material is allowed to cool and solidify into a solid layer, defects such as microfissures, cracks, and pores may form in the layer. These defects can create paths for the soil environment to access and start degrading the core. Although any additional layers may also exhibit such defects, the defects in one layer may be offset by non-defect areas in a coating layer above or below and in direct contact with the one layer. Thus, by applying multiple layers of coating material to the core, where each layer is allowed to cool and solidify before forming the next layer, the number of defects that run continuously or create a path from the outer surface of the outermost layer to the core decreases.

The number and size of the defects in a layer may vary depending on the core size, coating materials, the coating process, and the process parameters utilized for making the coated core. As such, the number of layers and the thickness of each layer necessary to obtain a desired fertilizer substance retention may vary depending upon the variables selected.

The coated core materials may then be used as fertilizer for plants. Appropriate amounts of the coated core material may be added to other fertilizer components, for example, by mixing. When the coated fertilizer particles are used as fertilizer, the amount of fertilizer substance, macronutrients, and/or micronutrients are controllably released into the soil and the fertilizer substance content of the coated fertilizer particles slowly dissipates into the soil.

EXAMPLES

A series of fluid-bed experiments are conducted. Samples include granular urea coated with a molten hydrogenated soybean oil (HSO)/oleic acid mixture at coating levels of approximately 5%, 10%, and 15% by weight, in relation to the weight of the granular urea and the coating material. A sample including urea coated with only molten HSO at a coating level of approximately 10% by weight in relation to the weight of the granular urea and the coating material is also included. The samples are coated in a 300N fluid-bed manufactured by Applied Chemical Technologies.

The fluid-bed is equipped with a bottom spray nozzle that is mounted approximately two inches from the base of an air distribution plate. The spray nozzle is a Spraying Systems 2850 air atomizing fluid cap and a 120 air cap. The fluidizing chamber is equipped with a draft tube assembly that produces fluidizing characteristics similar to a fountain effect of granules. This insert allows particles to be coated as they pass through this tube, thus producing a homogenous coating on the granules. The fluidization plate is a 2.5% open area draft tube plate with a 100 mesh stainless steel retention screen. The coating material is supplied to the spray nozzle by a FMI metering pump. The pump and all lines are traced with electrical heat tape and the temperature controlled by a Rheostat. The atomization air is heated by a compressed air heater controlled by a Rheostat before going to the nozzle. The filter cartridges are uncoated pleated polyester.

Test Descriptions

Test No. 1 is a 5% HSO and oleic acid coating. The 300N fluid-bed is preheated to 32° C. The HSO and oleic acid mixture is melted in a beaker on a hot plate at a temperature of 71° C. The fluid-bed is charged with 12 pounds of 280 SGN granular urea, and the fluidization velocity is adjusted to 315-335 FPM to provide a good fountain effect. The atomization air is started at 14 psig and a temperature of 119° C., and the test is conducted for 12 minutes. The amounts of the components used for Test No. 1 are shown below in Table 1.

A visual observation of the product indicated that the product has a smooth surface. The product has a nitrogen content of 43.94% as analyzed by a Leco Combustion Analyzer. The product also shows retention of 61.78% of the initial amount of nitrogen as tested for two hours by the Method N-500 slow release test. In the slow release test 250 mL of solution is used and 15 mL of Aliquot is used. Other parameters and results of the slow release test are shown below in Table 5.

Test No. 2 is a 10% HSO and oleic acid coating. The 300N fluid-bed is preheated to 32° C. The HSO and oleic acid mixture is melted in a beaker on a hot plate at a temperature of 71° C. The fluid-bed is charged with 9 pounds of 280 SGN granular urea, and the fluidization velocity is adjusted to 305-315 FPM to provide a good fountain effect. The atomization air is started at 14 psig and a temperature of 113° C., and the test is conducted for 20 minutes. The amounts of the components used for Test No. 2 are shown below in Table 2.

A visual observation of the product indicated that the product has a smooth surface. The product has a nitrogen content of 40.72% as analyzed by a Leco Combustion Analyzer. The product also shows retention of 85.28% of the initial amount of nitrogen as tested for two hours by the Method N-500 slow release test. In the slow release test 250 mL of solution is used and 15 mL of Aliquot is used. Other parameters and results of the slow release test are shown below in Table 5.

Test No. 3 is a 15% HSO and oleic acid coating. The 300N fluid-bed is preheated to 32° C. The HSO and oleic acid mixture is melted in a beaker on a hot plate at a temperature of 71° C. The fluid-bed is charged with 8.5 pounds of 280 SON granular urea, and the fluidization velocity is adjusted to 310-325 PPM to provide a good fountain effect. The atomization air is started at 14 psig and a temperature of 121° C., and the test is conducted for 35 minutes. The amounts of the components used for Test No. 3 are shown below in Table 3.

A visual observation of the product indicated that the product has a smooth surface. The product has a nitrogen content of 37.74% as analyzed by a Leco Combustion Analyzer. The product also shows retention of 98.47% of the initial amount of nitrogen as tested for two hours by the Method N-500 slow release test. In the slow release test 250 mL of solution is used and 15 mL of Aliquot is used. Other parameters and results of the slow release test are shown below in Table 5.

Test No. 4 is a 10% HSO only coating. The 300N fluid-bed is preheated to 32° C. The HSO and oleic acid is melted in a beaker on a hot plate at a temperature of 82° C. The fluid-bed is charged with 9 pounds of 280 SGN granular urea, and the fluidization velocity is adjusted to 360-380 PPM to provide a good fountain effect. The atomization air is started at 14 psig and a temperature of 104° C., and the test is conducted for 23 minutes. The amounts of the components used for Test No. 4 are shown below in Table 4.

A visual observation of the product indicated that the product has a rough surface with micro-cracks visible. The product has a nitrogen content of 43.29% as analyzed by a Leco Combustion Analyzer. The product also shows retention of 36.00% of the initial amount of nitrogen as tested for two hours by the Method N-500 slow release test. In the slow release test 250 mL of solution is used and 15 mL of Aliquot is used. Other parameters and results of the slow release test are shown below in Table 5.

TABLE 1

| Component | Amount (lbs.) |
| --- | --- |
| Urea | 12.00 |
| Hydrogenated Soybean Oil | 0.57 |
| Oleic Acid | 0.06 |

TABLE 2

| Component | Amount (lbs.) |
| --- | --- |
| Urea | 9.00 |
| Hydrogenated Soybean Oil | 0.90 |
| Oleic Acid | 0.10 |

TABLE 3

| Component | Amount (lbs.) |
|---|---|
| Urea | 8.50 |
| Hydrogenated Soybean Oil | 1.35 |
| Oleic Acid | 0.15 |

TABLE 4

| Component | Amount (lbs.) |
|---|---|
| Urea | 9.00 |
| Hydrogenated Soybean Oil | 1.00 |

TABLE 5

| Test No. | Sample Wt. (g) | Sample Avg. % N | Solution Avg. % N | N in Sample (g) | N in Solution (g) | % N retained |
|---|---|---|---|---|---|---|
| 1 | 3.0505 | 43.94 | 0.205 | 134.039 | 51.228 | 61.78 |
| 2 | 3.0217 | 40.72 | 0.073 | 123.044 | 18.110 | 85.28 |
| 3 | 3.0209 | 37.74 | 0.007 | 114.009 | 1.748 | 98.47 |
| 4 | 3.1195 | 43.29 | 0.346 | 135.043 | 86.423 | 36.00 |

As the above test results show, a fertilizer core coated with a mixture of HSO and oleic acid in an amount of at least 10% by weight of the core and the coating surrounding the core results in a slow release coated fertilizer as defined by the Association of American Plant Food Control Officials.

Examples 5-24

Table 6 below summarizes the fatty acid profiles of Examples 5-24, where coating materials comprising at least 93% by weight of saturated fatty acids were obtained using various mixtures of different raw materials.

TABLE 6

| | Raw Materials (wt % of total weight of coating raw materials) | | | | Fatty Acid Profile of Coating Material (wt % of total weight of coating) | | | |
|---|---|---|---|---|---|---|---|---|
| Example | AP 660 | 95% Palmitic Acid | 90% Stearic Acid | Liquid Oleic Acid | Palmitic Acid | Stearic Acid | Other Saturated Fatty Acids | Total Saturated Fatty Acids |
| 5 | 0 | 20 | 78 | 2 | 20.9 | 75.2 | 2.0 | 98.1 |
| 6 | 0 | 13.5 | 84.5 | 2 | 15.4 | 80.6 | 2.1 | 98.1 |
| 7 | 0 | 9 | 89 | 2 | 10.4 | 85.7 | 2.0 | 98.1 |
| 8 | 0 | 20 | 73.5 | 6.5 | 21.2 | 71.5 | 2.0 | 94.8 |
| 9 | 0 | 13.5 | 80 | 6.5 | 16.3 | 75.8 | 1.9 | 94.1 |
| 10 | 0 | 9 | 84.5 | 6.5 | 11.1 | 81.0 | 2.1 | 94.2 |
| 11 | 82 | 15.5 | 0 | 2.5 | 21.7 | 72.7 | 3.2 | 97.7 |
| 12 | 88.5 | 9 | 0 | 2.5 | 16.1 | 78.3 | 3.3 | 97.7 |
| 13 | 93 | 4.5 | 0 | 2.5 | 10.3 | 84.2 | 3.3 | 97.8 |
| 14 | 78 | 15.5 | 0 | 6.5 | 15.3 | 75.1 | 3.4 | 93.8 |
| 15 | 84.5 | 9 | 0 | 6.5 | 10.6 | 79.7 | 3.4 | 93.7 |
| 16 | 89 | 4.5 | 0 | 6.5 | 21.5 | 68.8 | 3.3 | 93.5 |
| 17 | 81 | 16.5 | 0 | 2.5 | 21.7 | 72.6 | 3.3 | 97.5 |
| 18 | 88 | 9.5 | 0 | 2.5 | 15.8 | 78.5 | 3.4 | 97.7 |
| 19 | 93 | 4.5 | 0 | 2.5 | 10.6 | 83.7 | 3.4 | 97.7 |
| 20 | 76.5 | 16.5 | 0 | 7 | 21.4 | 68.8 | 3.3 | 93.5 |
| 21 | 83.5 | 9.5 | 0 | 7 | 15.5 | 74.9 | 3.4 | 93.7 |
| 22 | 88 | 5 | 0 | 7 | 10.5 | 79.6 | 3.5 | 93.7 |
| 23 | 42 | 11 | 40.5 | 6.5 | 15.1 | 76.2 | 2.6 | 93.8 |
| 24 | 55.5 | 11 | 27 | 6.5 | 15.5 | 75.2 | 2.9 | 93.6 |

It will be appreciated that various of the above-disclosed and other features and functions, or alternatives thereof, may be desirably combined into many other different systems or applications. Also, variously presented unforeseen or unanticipated alternatives, modifications, variations, or improvements therein may be subsequently made by those skilled in the art, and are also intended to be encompassed by the following claims.

What is claimed is:

1. A composition, comprising:
a core comprising at least one fertilizer substance; and
at least one layer of a coating material surrounding the core, the coating material consisting essentially of oleic acid and partially or fully hydrogenated vegetable oil selected from the group consisting of partially or fully hydrogenated palm oil, partially or fully hydrogenated soybean oil, partially or fully hydrogenated rapeseed (canola) oil, partially or fully hydrogenated cottonseed oil, and partially or fully hydrogenated castor oil.

2. The composition of claim 1, wherein the fertilizer substance is urea.

3. The composition of claim 1, wherein the vegetable oil is partially or fully hydrogenated soybean oil.

4. The composition of claim 1, wherein the percentage of hydrogenation of the hydrogenated vegetable oil is from about 60% to 100%.

5. The composition of claim 1, wherein the core and the coating material surrounding the core are coated with a wax.

6. The composition of claim 1, wherein the weight % ratio of core material to coating material is from about 80:20 to about 90:10.

7. The composition of claim 1, wherein the core is surrounded by two or more layers of coating material.

8. The composition of claim 1, wherein the coating material has a melting temperature in the range of from about 40° C. to about 80° C.

9. The composition of claim 1, wherein the core is coated with a sufficient amount of coating material to obtain a fertilizer substance retention of at least 85%.

10. The composition of claim 1, wherein the coating material contains partially or fully hydrogenated vegetable oil in an amount of at least 90 wt % of the total weight of the coating material.

11. The composition of claim 1, wherein the partially or fully hydrogenated vegetable oil is partially hydrogenated soybean oil.

12. The composition of claim 1, wherein the partially or fully hydrogenated vegetable oil is fully hydrogenated soybean oil.

13. A fertilizer composition, comprising:
   a granulated core material comprising at least one fertilizer substance; and
   at least one layer of coating material consisting essentially of oleic acid and partially or fully hydrogenated vegetable oil, the coating material surrounding the core material.

14. The fertilizer composition of claim 13, wherein the core material and the coating material surrounding the core material are coated with a wax.

15. The composition of claim 13, wherein the core is coated with a sufficient amount of coating material to obtain a fertilizer substance retention of at least 85%.

16. A method of making a fertilizer composition, the method comprising: coating a core comprising at least one fertilizer substance with a continuous layer of a coating material consisting essentially of (i) oleic acid and (ii) partially or fully hydrogenated soybean oil; and
   allowing the layer of coating material to solidify to obtain a coated core.

17. The method of claim 16, further comprising:
   surrounding the coated core with one or more additional layers of coating material or a wax, wherein each layer of coating material or wax is allowed to solidify before adding a subsequent layer of coating material or wax.

* * * * *